(12) United States Patent
Gupta et al.

(10) Patent No.: US 8,281,387 B2
(45) Date of Patent: Oct. 2, 2012

(54) METHOD AND APPARATUS FOR SUPPORTING A VIRTUAL PRIVATE NETWORK ARCHITECTURE ON A PARTITIONED PLATFORM

(75) Inventors: Ajay Gupta, Hillsboro, OR (US); Jeong Yoon, Portland, OR (US); Jesse Walker, Portland, OR (US); Kapil Sood, Hillsboro, OR (US); Karanvir Grewal, Hillsboro, OR (US); Hormuzd M. Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1311 days.

(21) Appl. No.: 11/479,609

(22) Filed: Jun. 30, 2006

(65) Prior Publication Data
US 2008/0005791 A1   Jan. 3, 2008

(51) Int. Cl.
*G06F 9/00* (2006.01)
(52) U.S. Cl. .......................................... 726/15; 370/351
(58) Field of Classification Search ................... 726/15; 370/351
See application file for complete search history.

(56) References Cited

U.S. PATENT DOCUMENTS

| | | | | |
|---|---|---|---|---|
| 7,062,559 | B2* | 6/2006 | Yoshimura et al. | 709/226 |
| 7,272,832 | B2* | 9/2007 | Gardner | 718/105 |
| 7,593,373 | B2* | 9/2009 | Henry et al. | 370/338 |
| 7,665,132 | B2* | 2/2010 | Hisada et al. | 726/15 |
| 7,734,647 | B2* | 6/2010 | Suhonen et al. | 707/781 |
| 2006/0089121 | A1* | 4/2006 | Elgebaly et al. | 455/410 |
| 2007/0234412 | A1* | 10/2007 | Smith et al. | 726/11 |

* cited by examiner

*Primary Examiner* — Kambiz Zand
*Assistant Examiner* — Amare F Tabor
(74) *Attorney, Agent, or Firm* — L. Cho (57) ABSTRACT

A computer system includes a service partition, not directly accessible to a user, having a security agent to inspect data entering and exiting the computer system on a virtual private network (VPN) tunnel, and a service partition VPN unit to communicate with a VPN gateway. The computer system also includes a user partition, accessible to a user, having a user partition VPN unit to initiate construction of the VPN tunnel with the VPN gateway. Other embodiments are described and claimed.

17 Claims, 8 Drawing Sheets

METHOD AND APPARATUS FOR SUPPORTING A VIRTUAL PRIVATE NETWORK ARCHITECTURE ON A PARTITIONED PLATFORM

FIELD

An embodiment of the present invention relates to virtual private network (VPN) architectures. More specifically, an embodiment of the present invention relates to a method and apparatus for supporting a VPN architecture on a partitioned platform.

BACKGROUND

A VPN is a network that uses a public telecommunication infrastructure, such as the Internet, to provide remote offices or individual users with secure access to their organization's network. A VPN can be contrasted with an expensive system of owned or leased lines that can be used by one organization. The goal of VPN is to provide the organization with the same capabilities, but at a much lower cost.

A VPN uses a shared public infrastructure while maintaining privacy through security procedures and tunneling protocols such as the Layer Two Tunneling Protocol (L2TP) (published 1999). By encrypting data at the sending end and decrypting it at the receiving end, the tunneling protocols send data through a tunnel that cannot be entered in by data that is not properly encrypted. An additional level of security involves encrypting not only the data, but also the originating and receiving network addresses.

In order to provide improved security from sophisticated malicious programs, computer systems may utilize a dedicated partition to host security agents such as VPN security software components, security configuration, virus scanners and firewalls. In these systems, the ability of the security agents to protect a system is dependent on its ability to inspect clear text packets that enter and leave the system. Current VPN software architectures implemented in partitioned platforms keep data sent to a system encrypted until it enters a user partition that supports the VPN. Current VPN software architectures allow data transmitted to the user partition to bypass the security protocols implemented by the security agents in the dedicated partition.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
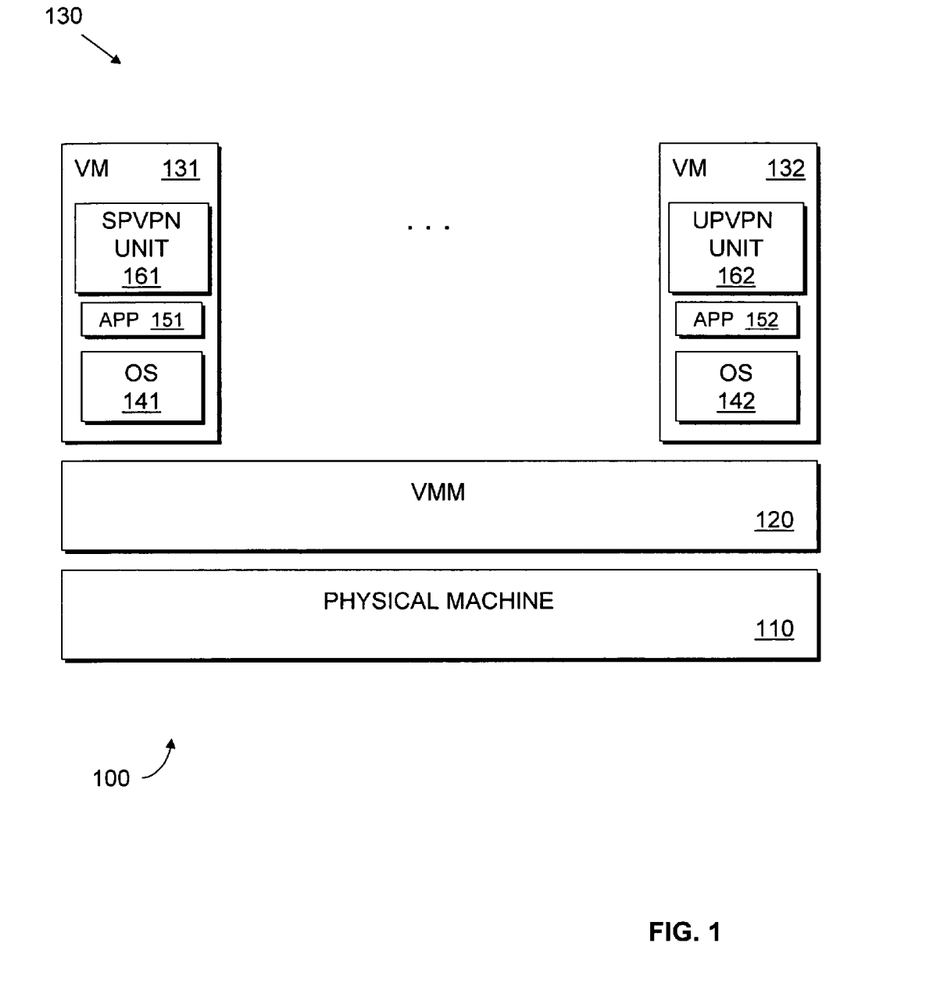
FIG. 1 is a block diagram that illustrates components of a system in which an exemplary embodiment of the invention resides.

FIG. 1 is a block diagram that illustrates components of a system 100 in which an embodiment of the invention resides. The system includes a physical machine 110. According to one embodiment, the physical machine 110 may include components of a computer system. The computer system may include, for example, one or more processors, a memory, buses, and various IO devices.

Figure 2:
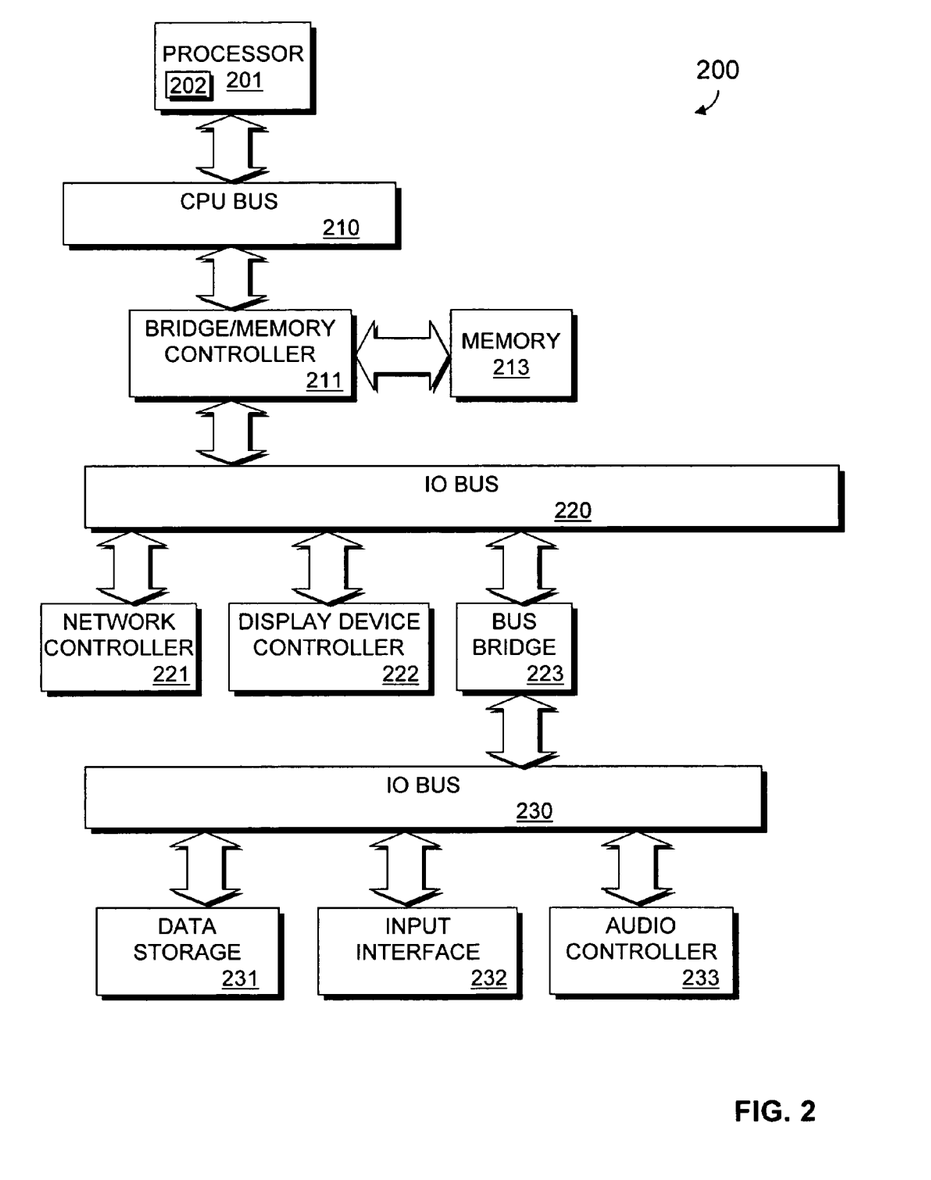
FIG. 2 illustrates an embodiment of the physical machine according to an exemplary embodiment of the present invention.

FIG. 2 is a block diagram of an exemplary computer system 200 according to an embodiment of the present invention. The computer system 200 may be used to implement the physical machine 110 shown in FIG. 1. The computer system 200 includes a processor 201 that processes data signals. The processor 201 may be a complex instruction set computer microprocessor, a reduced instruction set computing microprocessor, a very long instruction word microprocessor, a processor implementing a combination of instruction sets, or other processor device. FIG. 2 shows the computer system 200 with a single processor. However, it is understood that the computer system 200 may operate with multiple processors and that each of the processors may have one or more processor cores. Additionally, each of the one or more processors may support one or more hardware threads. The processor 201 is coupled to a CPU bus 210 that transmits data signals between processor 201 and other components in the computer system 200.

The computer system 200 includes a memory 213. The memory 213 may be a dynamic random access memory device, a static random access memory device, read-only memory, and/or other memory device. The memory 213 may store instructions and code represented by data signals that may be executed by the processor 201. A cache memory 202 may reside inside processor 201 that stores data signals stored in memory 213. The cache 202 speeds access to memory by the processor 201 by taking advantage of its locality of access. In an alternate embodiment of the computer system 200, the cache 202 resides external to the processor 201. A bridge memory controller 211 is coupled to the CPU bus 210 and the memory 213. The bridge memory controller 211 directs data signals between the processor 201, the memory 213, and other components in the computer system 200 and bridges the data signals between the CPU bus 210, the memory 213, and a first IO bus 220.

The first IO bus 220 may be a single bus or a combination of multiple buses. The first IO bus 220 provides communication links between components in the computer system 200. A network controller 221 is coupled to the first IO bus 220. The network controller 221 may link the computer system 200 to a network of computers (not shown) and supports communication among the machines. A display device controller 222 is coupled to the first IO bus 220. The display device controller 222 allows coupling of a display device (not shown) to the computer system 200 and acts as an interface between the display device and the computer system 100.

A second IO bus 230 may be a single bus or a combination of multiple buses. The second IO bus 230 provides communication links between components in the computer system 200. A data storage device 231 is coupled to the second IO bus 230. The data storage device 231 may be a hard disk drive, a floppy disk drive, a CD-ROM device, a flash memory device or other mass storage device. An input interface 232 is coupled to the second IO bus 230. The input interface 232 may be, for example, a keyboard and/or mouse controller or other input interface. The input interface 232 may be a dedicated device or can reside in another device such as a bus controller or other controller. The input interface 232 allows coupling of an input device to the computer system 200 and transmits data signals from an input device to the computer system 200. An audio controller 233 is coupled to the second IO bus 230. The audio controller 233 operates to coordinate the recording and playing of sounds and is also coupled to the IO bus 230. A bus bridge 223 couples the first IO bus 220 to the second IO bus 230. The bus bridge 223 operates to buffer and bridge data signals between the first IO bus 220 and the second IO bus 230. It should be appreciated that computer systems having a different architecture may also be used to implement the physical machine 110.

Referring back to FIG. 1, the system 100 includes a VMM 120. The VMM 120 is a layer that interfaces the physical machine 110 and that facilitates one or more VMs 130 to be run. According to an embodiment of the present invention, the VMM 120 may be a sequence of instructions stored in a memory of a computer system. The VMM 120 manages and mediates computer system resources in the physical machine 110 between the VMs 130 and allows the isolation of or data sharing between VMs 130. The VMM 120 achieves this isolation or sharing by virtualizing resources in the physical machine 110 and exporting a virtual hardware interface (i.e., a VM) that could reflect an underlying architecture of the physical machine 110, a variant of the physical machine, or an entirely different physical machine.

The system 100 includes one or more VMs 131-132 (collectively shown as 130). Block 131 represents a first VM. Block 132 represents an n-th VM, where n may be any number. According to an embodiment of the present invention, a VM may be described as an isolated model of a machine including, but not limited to, a replica of the physical machine, a subset of the physical machine, or model of an entirely different machine. A VM may include the resources of the computer system in the physical machine 110, a subset of the resources of the computer system in the physical machine 110, or entirely virtual resources not found in the physical machine.

According to an embodiment of the present invention, the VMM 120 has control of the physical machine 110 and creates VMs 130, each of which behaves like a physical machine that can run its own operating system (OS). VMs 131-132 are partitions that may run operating systems (guest operating systems) 141-142 respectively where the operating systems 141-142 may be unique to one another. To maximize performance, the VMM 120 allows a VM to execute directly on the resources of the computer system in the physical machine 110 when possible. The VMM 120 takes control, however, whenever a VM attempts to perform an operation that may affect the operation of other VMs, the VMM 120 or of the operation of resources in the physical machine 110. The VMM 120 emulates the operation and may return control to the VM when the operation is completed. One or more applications (guest applications) may be run on each of the VMs 131-132. As shown in this example, applications (APPs) 151-152 are run on VMs 131-132, respectively.

According to an embodiment of the system 100, VM 131 is a dedicated service partition. The VM 131 may execute an application 151 which may include security agents such as VPN encryption security software components, virus scanners, firewalls, and/or other security agents that inspect data for viruses, worms, and/or other malicious programs. VM 131 partitions the security agents from operating systems and applications executing in other VMs in the system. According to one embodiment, the isolated execution environment of the operating system 141 and applications 151 on VM 131 are provided in a headless manner with limited or no access from a user of other applications in the system. According to an embodiment of the system 100, VM 132 is a user partition. The VM 132 is accessible to a user of the system 100 and may execute an application 152 initiated by the user.

According to an embodiment of the present invention, the application 151 may include one or more programs that perform manageability tasks or other functions on the system 100. For example, the application 151 may communicate on a VPN tunnel or re-establish a VPN tunnel when the user partition 132 is inoperable. The application 151 may communicate with a management console or servers in an external network, such as a corporate intranet, when VPN is used.

The VM 131 includes a service partition VPN (SPVPN) unit 161 and the VM 132 includes a user partition VPN (UPVPN) unit 162. The service partition VPN unit 161 and the user partition VPN 162 operate to allow a partitioned platform, such as system 100, to support a VPN architecture. Data received from a VPN gateway is accessed by the service partition VPN unit 161. The service partition VPN unit 161 decrypts the data into a clear format to allow one or more security agents to inspect it. The data may then be transmitted to the user partition VPN unit 162 via a shared channel. Data originating from the user partition is transmitted from the user partition VPN unit 162 to the service partition VPN unit 161 over the shared channel. The service partition VPN unit 161 inspects the data before encrypting it for transmission to the VPN gateway. The user partition VPN unit may initiate the construction of the VPN tunnel with the VPN gateway.

FIG. 1 illustrates the service partition and user partition as being implemented by VMs. It should be appreciated that the service partition and user partition and the isolation of the service partition and user partition may be implemented using other software or hardware procedures and techniques.

Figure 3:
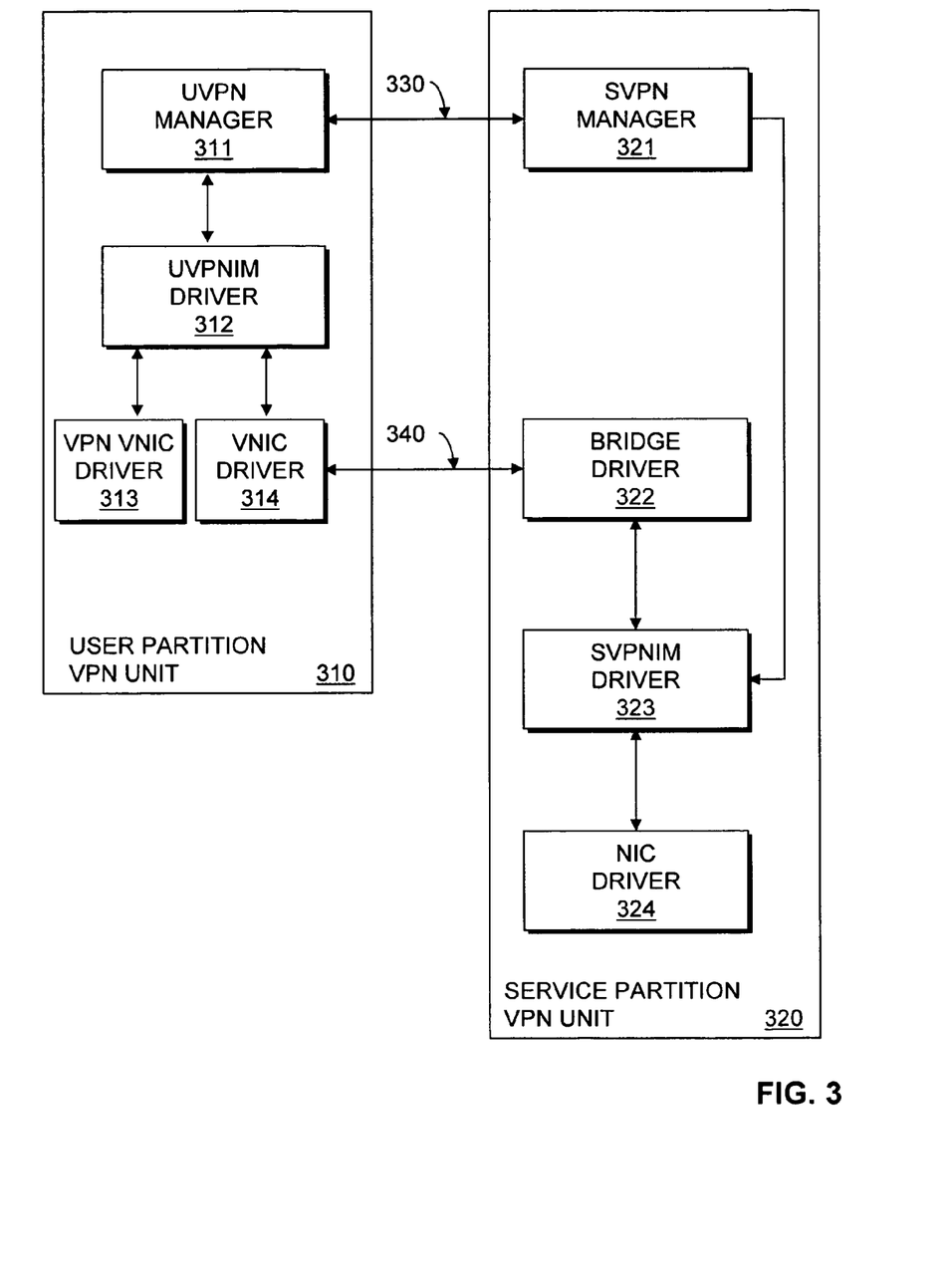
FIG. 3 is a block diagram of components in a user partition VPN unit and a service partition VPN unit according to an exemplary embodiment of the present invention.

FIG. 3 is a block diagram of components in a user partition VPN unit 310 and a service partition VPN unit 320 according to an exemplary embodiment of the present invention. The user partition VPN unit 310 and service partition VPN unit 320 may be used to implement the user partition VPN unit 162 and service partition VPN unit 161 shown in FIG. 1. The user partition VPN unit 310 includes a user VPN (UVPN) manager 311. The UVPN manager 311 receives credentials and configuration information from a user initiating the construction of a VPN tunnel to a VPN gateway. The UVPN manager 311 establishes a secure shared channel 330 with the service partition VPN unit 320. According to an embodiment of the present invention, the secure shared channel 330 may be a secure shared memory channel. The UVPN manager 311 authenticates the service partition VPN unit 320, and encrypts data transmitted to the service partition VPN unit 320.

The user partition VPN unit 310 includes a user VPN intermediate miniport (UVPNIM) driver 312. The UVPNIM driver 312 routes data received from a TCP/IP stack in an operating system or from another source to an appropriate virtual network interface card (VNIC) driver.

The user partition VPN unit 310 includes a VNIC drivers 313, and 314. The VPN VNIC driver 313 provides a virtual interface to the TCP/IP stack in the operating system in the user partition. The TCP/IP stack in the user partition binds an inner tunnel IP address to the VNIC driver 314. According to one embodiment, no packets actually pass through VPN VNIC driver 313. The VNIC driver 314 receives data from the user UVPNIM driver 312 and routes the data through a shared channel 340 to a bridge driver 322 on the service partition VPN unit 320. According to an embodiment of the present invention, the shared channel 340 may be a shared memory channel.

The service partition VPN unit 320 includes a service VPN (SVPN) manager 321. The SVPN manager 321 authenticates the user partition VPN unit 310 when establishing secure channel with the user partition VPN unit 310. The SVPN manager 321 transmits credentials and configuration information from the user partition VPN unit 310 to a VPN gateway. The SVPN manager 321 also generates encryption and decryption keys to use for encrypting and decrypting communication with the VPN gateway. According to an embodiment of the present invention, the SVPN manager 321 may also initiate the construction of a VPN tunnel in the event that one or more applications on the user partition require remediation.

The service partition VPN unit 320 includes a bridge driver 322. The bridge driver 322 receives data from the user partition VPN unit 310. According to an embodiment of the present invention, the bridge driver 322 allows the data to be inspected by virus scanners, firewalls, and/or other security agents on the service partition that detect viruses, worms, and/or other malicious programs. The bridge driver 322 routes data between the VNIC driver 314 in the user partition VPN unit 310 and a SVPNIM driver 323 on the service partition VPN unit 320.

The service partition VPN unit 320 includes a service VPN IM (SVPNIM) driver 323. The SVPNIM driver 323 securely receives the encryption and decryption keys generated by the SVPN manager 321. The SVPNIM driver 323 encrypts data to be transmitted over the VPN gateway with the encryption key. The service VPN IM driver 323 also decrypts data received over the VNP gateway with the decryption key. The service VPN IM driver 323 also performs encapsulation function over packets transmitted to VPN gateway and decapsulation function over packets received from the VPN gateway.

The service partition VPN unit 320 includes a network interface card (NIC) driver 324. The NIC driver transmits data to a network interface card on a system.

It should be appreciated that the user partition VPN unit 310 and the service partition VPN unit 320 may each include a VPN VNIC driver. The VPN VNIC drivers may provide a virtual interface to their corresponding TCPI/IP stacks for inner tunnel IP addressing for some operating systems.

Figure 4:
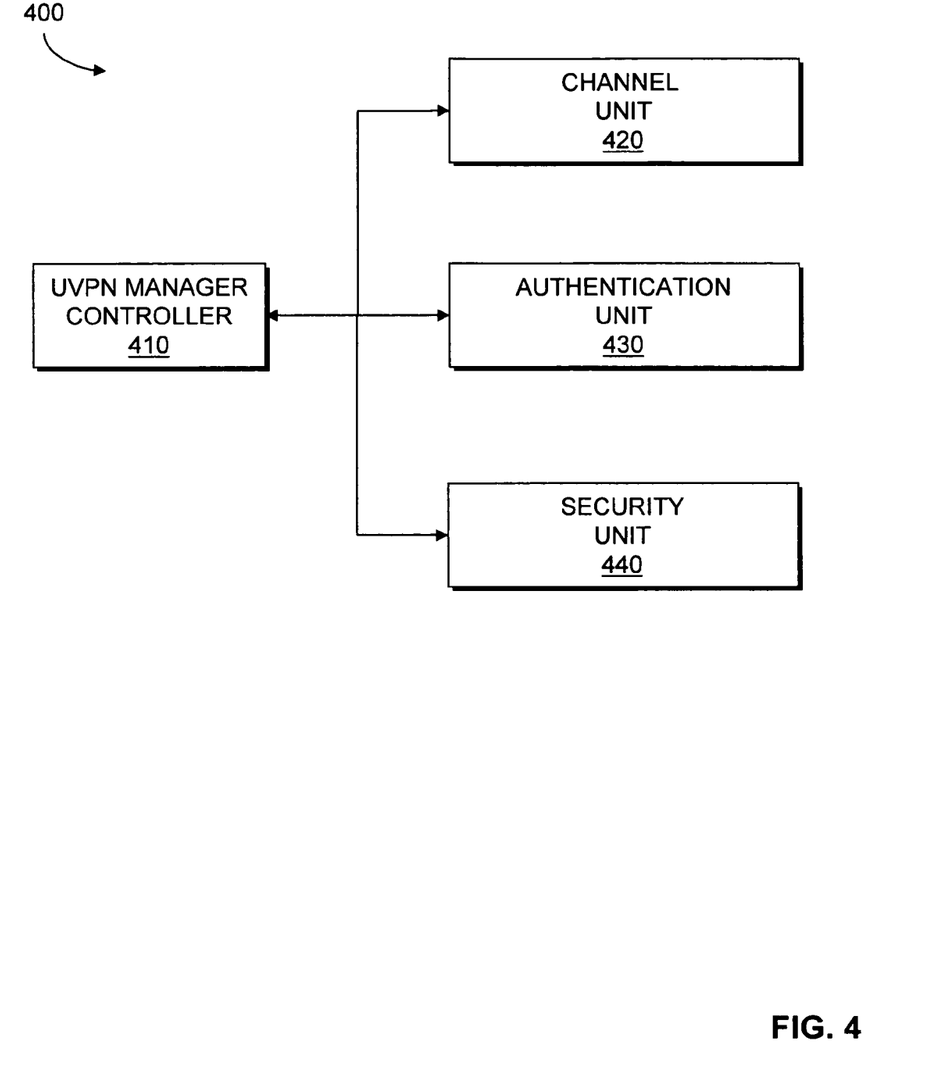
FIG. 4 is a block diagram of a user VPN manager unit according to an exemplary embodiment of the present invention.

FIG. 4 is a block diagram of a UVPN manager 400 according to an exemplary embodiment of the present invention. The UVPN manager 400 may be utilized to implement the UVPN manager 311 shown in FIG. 3. The UVPN manager 400 includes a UVPN manager controller 410. The UVPN manager controller 410 provides a user interface that allows a user to input or direct the UVPN manager 400 to access user credentials and configuration information when initiating a VPN tunnel to a VPN gateway. The UVPN manager controller 410 is coupled to and transmits information to other components in the UVPN manager 400.

The UVPN manager 400 includes a channel unit 420. The channel unit 420 establishes a secure shared channel with a SVPN manager in a service partition VPN unit. According to an embodiment of the present invention, a Transport Layer Security (TLS) protocol (published 2006) session using Extensible Authentication Protocol—Transport Layer Security (EAP-TLS) (published 1999) is created between the two partitions. Alternatively, Extensible Authentication Protocol—Tunneled Transport Layer Security (EAP-TTLS) (published 2002) or Protected Extensible Authentication Protocol (PEAP) (published 2002) may be used for establishing the secure shared channel. It should be appreciated that other procedures or techniques may also be used.

The UVPN manager 400 includes an authentication unit 430. The authentication unit 430 analyzes the credentials of the service partition VPN unit. Upon determining the identity authenticity of the service partition VPN unit, the authentication unit 430 allows data to be transmitted between the user partition VPN unit and the service partition VPN unit.

The UVPN manager 400 includes a security unit 440. The security unit 440 encrypts data, such as user credentials and configuration information, transmitted from the UVPN manager 400 to the SVPN manager over the secure shared channel. The security unit 440 also decrypts data transmitted from the SVPN manager to the UVPN manager 400 over the secure shared channel.

Figure 5:
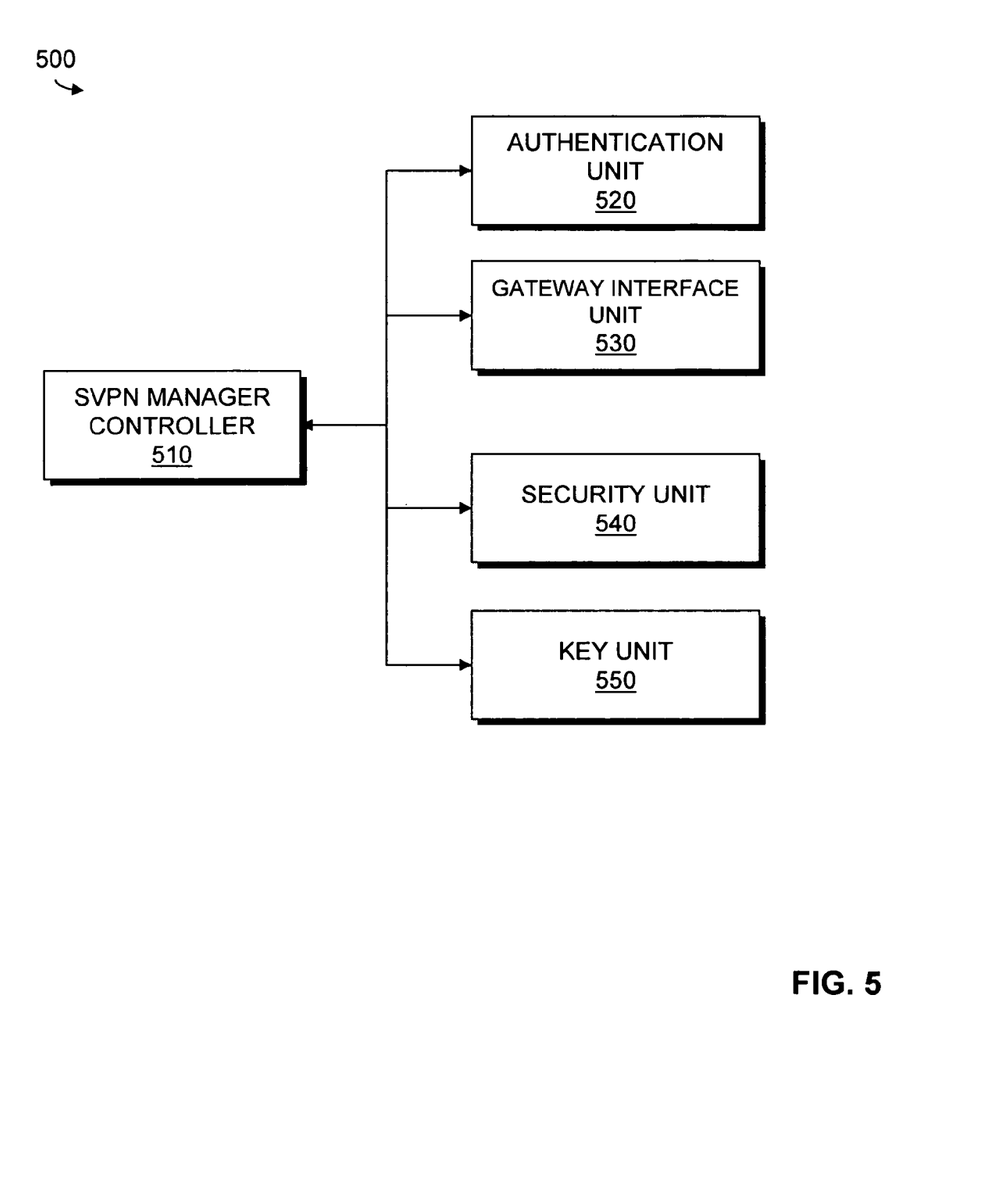
FIG. 5 is a block diagram of a service VPN manager unit according to an exemplary embodiment of the present invention.

FIG. 5 is a block diagram of a SVPN manager 500 according to an exemplary embodiment of the present invention. The SVPN manager 500 may be utilized to implement the SVPN manager 321 shown in FIG. 3. The SVPN manager 500 includes a SVPN manager controller 510. The SVPN manager controller 510 is coupled to and transmits information to other components in the SVPN manager 500.

The SVPN manager unit 500 includes an authentication unit 520. The authentication unit 520 analyzes UVPN manager credentials from the user partition VPN unit. Upon determining the entity authenticity of UVPN manager, the authentication unit 520 allows data to be transmitted between the service partition VPN unit and the user partition VPN unit.

The SVPN manager 500 includes a gateway interface unit 530. The gateway interface unit 530 establishes a secure communication channel with the VPN gateway for the SVPN manager 500 to use.

The SVPN manager 500 includes a security unit 540. The security unit 540 encrypts data, such as service credentials, transmitted from the SVPN manager 500 to a UVPN manager over a secure shared channel. The security unit 540 also decrypts data transmitted from the UVPN manager to the SVPN manager 500 over the secure shared channel.

The SVPN manager 500 includes a key unit 550. The key unit 550 generates encryption and decryption keys to be used for protected communication between the service partition VPN unit and the VPN gateway. According to an embodiment of the present invention, the Internet Key Exchange (IKE) protocol (published 1998) may be used to derive key for the service partition VPN unit and the VPN gateway. It should be appreciated that other procedures and techniques may also be used to derive the keys.

It should be appreciated that embodiments of the present invention may be implemented in a single core or multi-core platform, on platform resource layer components, or on in an embedded processor on the platform.

Figure 6:
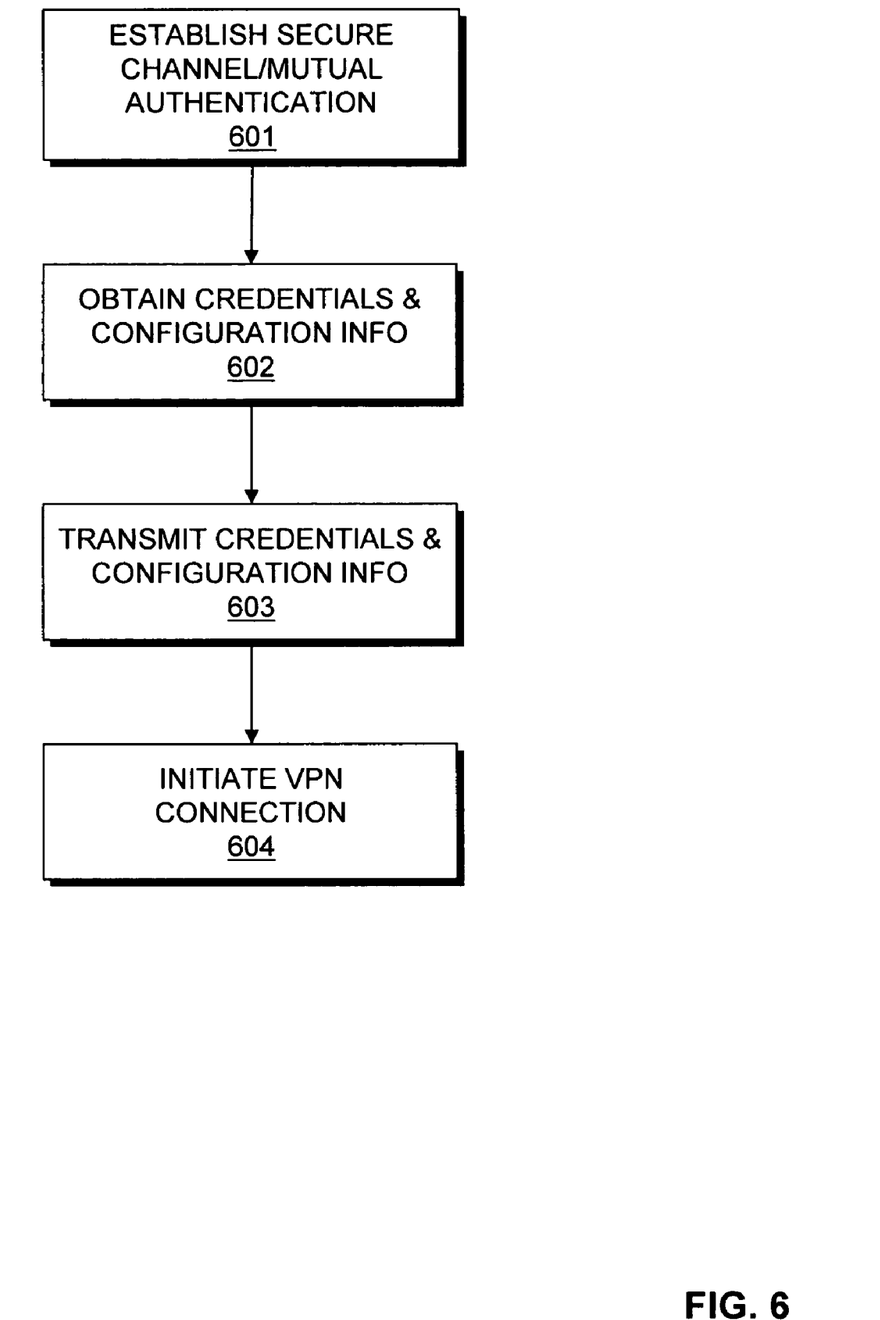
FIG. 6 is a flow chart illustrating a method for initiating a VPN connection on a partitioned platform according to an exemplary embodiment of the present invention.

FIG. 6 is a flow chart illustrating a method for initiating a VPN connection on a partitioned platform according to an exemplary embodiment of the present invention. At 601, a secure channel is established between a UVPN manager in a user partition of a computer system and a SVPN manager in a service partition of the computer system. The secure channel may be established by creating a TLS protocol session using EAP-TLS between the two partitions, using strong credentials such as digital certificates. Alternatively, EAP-TTLS, PEAP, or other procedures or techniques may also be used to create the channel. As part of establishing the secure channel the UVPN manager and SVPN manager mutually authenticate each other. The UVPN manager may use the service credentials received to authenticate the service partition VPN unit. The SVPN manager may use the user credentials received to authenticate the user partition VPN unit. Upon authentication and establishment of secure channel, data may be allowed to be transmitted between the user partition and the service partition.

At 602, credentials and configuration information are obtained. According to an embodiment of the present invention, user credentials and configuration information may be obtained from the user partition directly from a user. When operating in a mode where user partition is unhealthy, credentials may be obtained from persistent storage device.

At 603, the credentials and configuration information are transmitted. According to an embodiment of the present invention, the user credentials and configuration information are encrypted before being transmitted from the UVPN manager in the user partition to the SVPN manager in the service partition.

At 604, a VPN connection is initiated by the service partition. According to an embodiment of the present invention, the SVPN manager establishes a connection with a VPN gateway and generates keys for communication over a VPN tunnel with the user credentials. According to one embodiment, the IKE protocol may be used to generate encryption and decryption keys to be used for communication. These keys may be securely transmitted to a component in the service partition such as the service SVPNIM driver.

Figure 7:
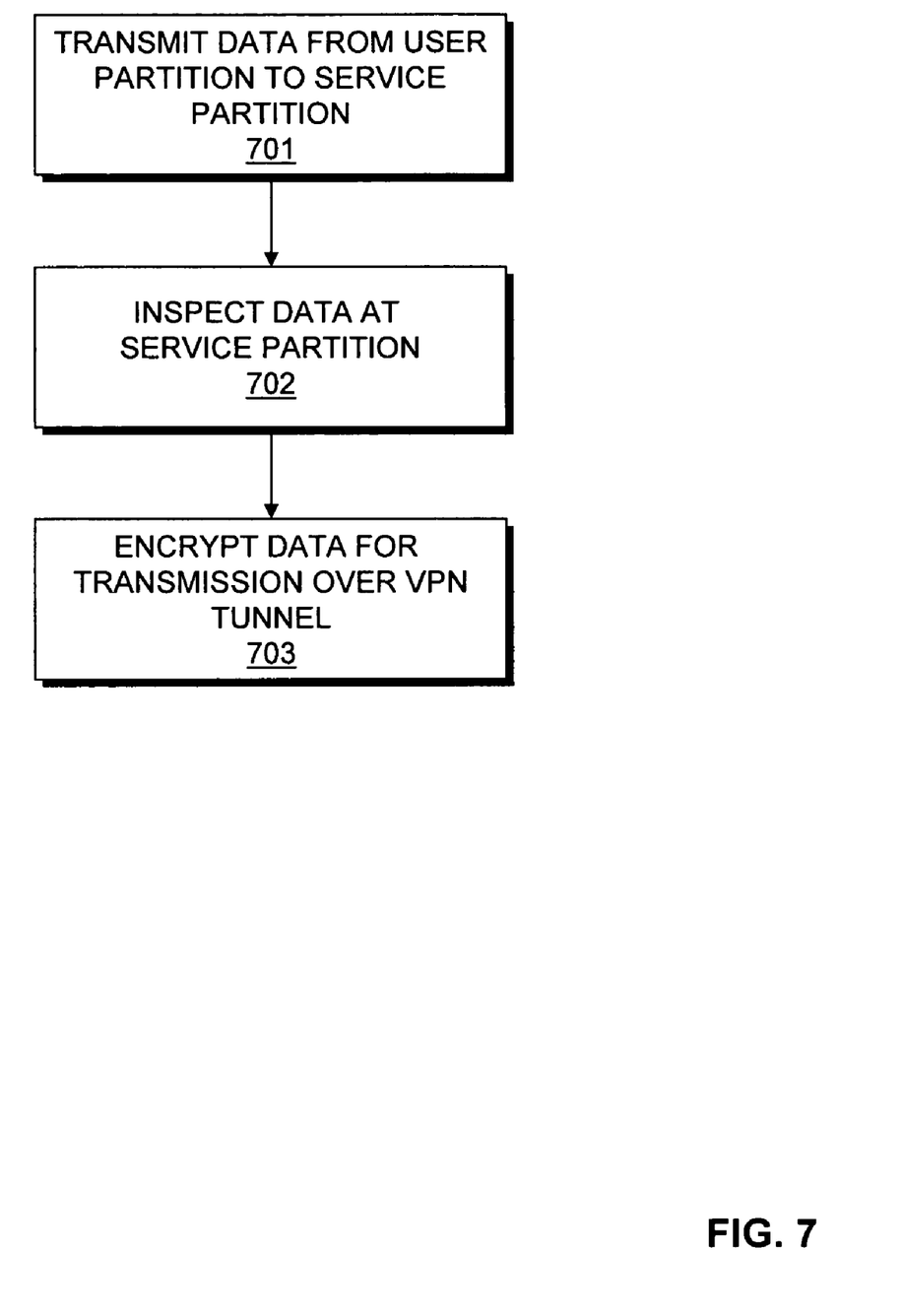
FIG. 7 is a flow chart illustrating a method for transmitting data to a VPN gateway on a partitioned platform according to an exemplary embodiment of the present invention.

FIG. 7 is a flow chart illustrating a method for transmitting data to a VPN gateway on a partitioned platform according to an exemplary embodiment of the present invention. At 701, data from a user partition of a computer system is transmitted to a service partition of the computer system over a shared secure channel. According to an embodiment of the present invention, the data may originate from a TCP/IP stack in an operating system. The data may be transmitted via a UVPNIM driver and VNIC driver on the user partition to a bridge driver on the service partition.

At 702, the data is inspected at the service partition. According to an embodiment of the present invention, the data may be inspected for a malicious program using a virus scanner, firewall, and/or other security agents.

At 703, the data is encrypted for transmission over the VPN tunnel at the service partition. According to an embodiment of the present invention, the data may be encrypted at the SVPNIM driver.

Figure 8:
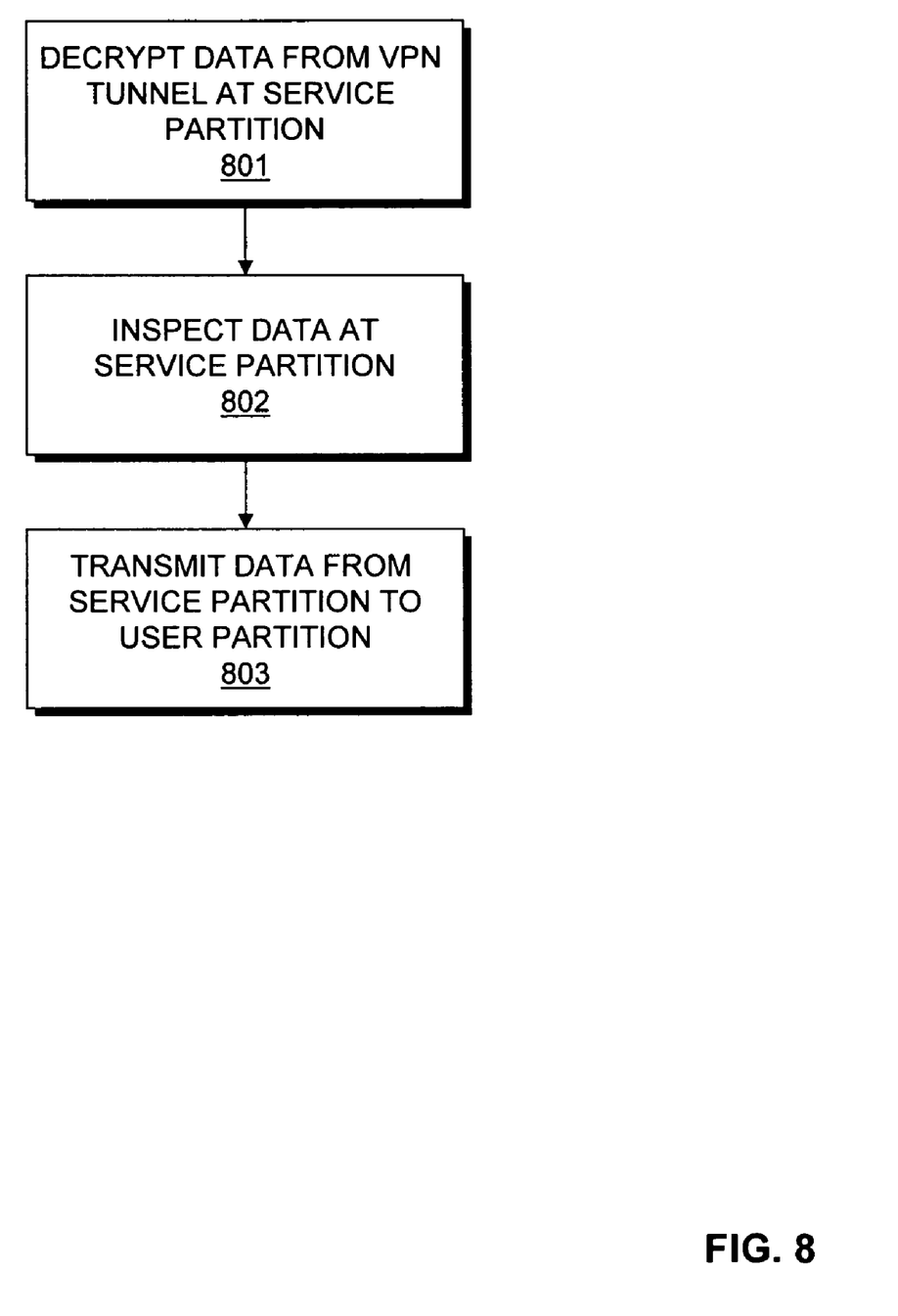
FIG. 8 is a flow chart illustrating a method for processing data received from a VPN gateway on a partitioned platform according to an exemplary embodiment of the present invention.

FIG. 8 is a flow chart illustrating a method for processing data received from a VPN gateway on a partitioned platform according to an exemplary embodiment of the present invention. At 801, data received over a VPN tunnel is decrypted at a service partition of a computer system. According to an embodiment of the present invention, the data may be decrypted at the SVPNIM driver.

At 802, the data is inspected at the service partition. According to an embodiment of the present invention, the data may be inspected for a malicious program using a virus scanner, firewall, and/or other security agents.

At 803, the data is transmitted from the service partition of the computer system to a user partition of the computer system. According to an embodiment of the present invention, the data may be transmitted via a bridge driver on the service partition to a VNIC driver and UVPNIM driver on the user partition. According to an embodiment of the present invention, the data is encrypted for transmission upon determining that the data does not include a malicious program. In this embodiment, if it is determined that the data includes a malicious program, remediation actions may be performed. The remediation actions may include disconnecting the VPN tunnel, generating alerts, and/or other actions. It should be appreciated that the remediation actions may be transparent to the user.

FIGS. 6-8 are flow charts illustrating embodiments of the present invention. Some of the techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A computer system, comprising:
a service partition, not accessible to a user, having a security agent to inspect data entering and exiting the computer system on a virtual private network (VPN) tunnel, and a service partition VPN unit to communicate with a VPN gateway; and
a user partition, accessible to a user, having a user partition VPN unit to initiate construction of the VPN tunnel with the VPN gateway, wherein the service partition and the user partition are implemented using a first virtual machine and a second virtual machine.

2. The computer system of claim 1, wherein the user partition VPN unit comprises a user VPN (UVPN) manager that includes a user interface to receive credentials and configuration information from the user, a channel unit to establish a secure channel with the service partition VPN unit, an authentication unit to authenticate the service partition VPN unit, and a security unit to encrypt data transmitted to the service partition VPN unit.

3. The computer system of claim 1, wherein the service partition VPN unit comprises a service VPN (SVPN) manager that includes an authentication unit to authenticate the user partition VPN unit, a gateway interface to transmit credentials and configuration information from the user to the VPN gateway, and a key unit to generate encryption keys to use for communication with the VPN gateway.

4. The computer system of claim 1, wherein the user partition VPN unit comprises a VPN intermediate miniport (IM) driver to route data to an appropriate virtual network interface card (VNIC) driver.

5. The computer system of claim 1, wherein the user partition VPN unit comprises a virtual interface card (VNIC) driver to route data to a bridge driver on the service partition VPN unit.

6. The computer system of claim 1, wherein the service partition VPN unit comprises a VPN intermediate miniport (IM) driver to encrypt data transmitted over the VPN gateway and to decrypt data received over the VPN gateway.

7. The computer system of claim 1, wherein the security agent comprises an anti-virus program.

8. The computer system of claim 1, wherein the security agent comprises a firewall.

9. The computer system of claim 1, wherein the service partition includes an application to communicate with an external network.

10. The computer system of claim 1, wherein the service partition includes an application to re-establish the VPN tunnel when the user partition is inoperable.

11. A method for managing data in a partitioned platform, comprising:
    decrypting first data, received on a virtual private network (VPN) tunnel, at a service partition of a computer system not accessible by a user;
    inspecting the first data for a malicious program at the service partition;
    transmitting the first data over a shared channel to a user partition of the computer system initiating the VPN tunnel in response to determining that the first data does not include a malicious program; and
    dropping the first data and performing remediation upon determining that the first data includes the malicious program.

12. The method of claim 11, further comprising:
    transmitting second data from the user partition of the computer system to the service partition of the computer system over the shared channel;
    inspecting the second data for the malicious program; and
    encrypting the second data for transmission over the VPN tunnel in response to determining that the first data does not include the malicious program.

13. The method of claim 11, further comprising:
    transmitting user credentials and configuration information from a user VPN manager to a service VPN manager over a secure shared channel; and
    generating a key for communication over the VPN tunnel with the user credentials.

14. The method of claim 13, further comprising establishing a secure shared channel between a user partition VPN manager and a service partition VPN manager.

15. The method of claim 13, further comprising authenticating the user partition VPN manager and the service partition VPN manager.

16. The method of claim 11, further comprising securely transmitting the key to a VPN intermediate miniport (IM) driver.

17. An article of manufacture comprising a machine accessible medium including sequences of instructions, the sequences of instructions including instructions which when executed cause the machine to perform:
    decrypting first data, received on a virtual private network (VPN) tunnel, at a service partition of a computer system not accessible by a user;
    inspecting the first data for a malicious program at the service partition;
    transmitting the first data over a shared channel to a user partition of the computer system initiating the VPN tunnel in response to determining that the first data does not include the malicious program; and
    dropping the first data and performing remediation upon determining that the first data includes the malicious program.

* * * * *